United States Patent
Bauer et al.

(10) Patent No.: US 6,868,657 B2
(45) Date of Patent: Mar. 22, 2005

(54) MOWING MACHINES WITH ERGONOMIC HAND CONTROL LEVERS

(75) Inventors: Brian E. Bauer, Holly Springs, NC (US); Ellis R. West, Dunn, NC (US); Douglas D. Korthals, Crestwood, KY (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/147,547

(22) Filed: May 15, 2002

(65) Prior Publication Data

US 2003/0213219 A1 Nov. 20, 2003

(51) Int. Cl.$^7$ .............................................. A01D 34/00
(52) U.S. Cl. .................. 56/14.7; 56/DIG. 18; 74/484 R
(58) Field of Search ................... 56/14.7, 16.7, 56/DIG. 18; 74/486, 488, 543, 551.1, 551.9, 484 R; 172/41, 42, 329, 364

(56) References Cited

U.S. PATENT DOCUMENTS

| | | | | |
|---|---|---|---|---|
| 4,487,006 A | * | 12/1984 | Scag | 56/14.7 |
| 4,541,497 A | * | 9/1985 | Riediger et al. | 180/6.48 |
| 4,558,558 A | | 12/1985 | Horner | |
| 5,146,735 A | | 9/1992 | McDonner | |
| 5,307,612 A | * | 5/1994 | Tomiyama et al. | 56/11.1 |
| 5,343,678 A | | 9/1994 | Stuart | |
| 5,553,992 A | * | 9/1996 | Ashcroft | 414/685 |
| 5,644,903 A | * | 7/1997 | Davis, Jr. | 56/10.8 |
| 5,653,304 A | * | 8/1997 | Renfroe | 180/402 |
| 5,697,623 A | * | 12/1997 | Bermes et al. | 280/32.7 |
| 5,740,613 A | * | 4/1998 | Swistun et al. | 30/276 |
| 5,809,755 A | | 9/1998 | Velke | |
| 5,826,992 A | * | 10/1998 | Camacho et al. | 400/489 |
| 5,913,802 A | * | 6/1999 | Mullet et al. | 56/10.8 |
| 5,964,082 A | * | 10/1999 | Wright et al. | 56/14.7 |
| 5,979,015 A | * | 11/1999 | Tamaribuchi | 16/110.1 |
| D424,578 S | * | 5/2000 | Friberg et al. | D15/18 |
| 6,059,055 A | | 5/2000 | Velke | |
| 6,070,690 A | | 6/2000 | Eavenson et al. | |
| 6,094,897 A | | 8/2000 | Velke | |
| 6,148,946 A | * | 11/2000 | Takahasi et al. | 180/316 |
| 6,261,141 B1 | * | 7/2001 | Heap | 440/101 |
| 6,304,431 B1 | * | 10/2001 | Kim | 361/680 |
| 6,341,479 B1 | | 1/2002 | Scag et al. | |
| 6,516,596 B2 | * | 2/2003 | Velke et al. | 56/14.7 |
| 6,557,331 B2 | * | 5/2003 | Busboom et al. | 56/10.8 |

OTHER PUBLICATIONS

Great Dane Power Equipment, Inc. Chariot Jr. photo from www.greatdanemowers.com/chariotjr/chariotjr04,html printed on Jul. 31, 2002.
Great Dane Power Equipment, Inc. Scamper photo from www.greatdanemowers.com/scamper/scamper01.html printed on Jul. 31, 2002.
Great Dane Power Equipment, Inc. Scamper photo from www.greatdanemowers.com/scamper/scamper06.html printed on Jul. 31, 2002.
Great Dane Power Equipment, Inc. Super Surfer photo from www.greatdanemowers.com/supersurfer01.html printed on Jul. 31, 2002.
Great Dane Power Equipment, Inc. Super Surfer photo from www.greatdanemowers.com/supersurfer/ supersurfer04.html printed on Jul. 31, 2002.
Great Dane Power Equipment, Inc. Super Surfer photo from www.greatdanemowers.com/supersurfer/ supersurfer06.html printed on Jul. 31, 2002.
Great Dane Power Equipment, Inc. Super Surfer photo from www.schuurmansfarmsupply.com printed on Apr. 10, 2002.

\* cited by examiner

*Primary Examiner*—Thomas B. Will
*Assistant Examiner*—Nathan S Mammen
(74) *Attorney, Agent, or Firm*—Bell, Boyd & Lloyd, LLC

(57) ABSTRACT

Hand control levers with ergonomic grip members. Such hand control levers are used on vehicles, preferably lever-operated mowing machines. The hand control levers can reduce anatomical stress, fatigue or discomfort experienced by users of such vehicles.

9 Claims, 8 Drawing Sheets

MOWING MACHINES WITH ERGONOMIC HAND CONTROL LEVERS

BACKGROUND OF THE INVENTION

The present invention generally relates to mowing machines. More specifically, the present invention relates to mowing machines which include ergonomic hand control levers which can reduce or eliminate certain anatomical stress associated with the operation of such mowing machines.

Self-propelled mowing machines are well known. Certain self-propelled mowing machines include two hand control levers, each of which is separately associated with a drive wheel. By manipulating the hand control levers, a user can control the speed and direction of the mowing machine.

Figure 1:
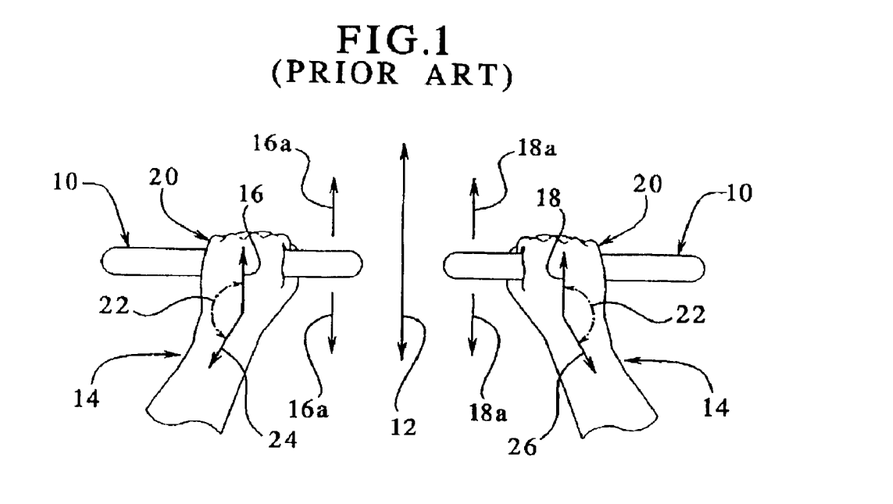
FIG. 1 is a top or plan view of the prior art hand control levers, illustrating a user pushing and pulling the prior art hand control levers.

As illustrated in FIG. 1, an existing lever-operated mowing machine has hand control levers 10 which are substantially perpendicular to the mowing machine's travel line 12. The hand control levers 10 move in a forward and backward line of direction. The user pushes and pulls the hand control levers 10 along the force lines 16 and 18. The push/pull action is indicated by arrows 16a and 18a.

Typically, when the user pushes or pulls the hand control levers 10 forward or backward, at some point the user moves his/her elbows apart from his/her body. When the elbow is obviated from the body, the wrists 14 and hands 20 become radially deviated. In other words, the wrists 14 and hands 20 are rotated counterclockwise in a plane horizontal to the driving surface. This radial deviation can form: (a) a wrist angle 22 between the force line 16 and the forearm axis 24; and (b) a wrist angle 22 between the force line 18 and the forearm axis 26. Pushing and pulling the hand control levers 10 at this wrist angle can create anatomical stress in the user's wrists 14, hands, arms and other parts of the body.

No commercial mowing machines are known to have hand control levers which are ergonomically configured to reduce the user's anatomical stress, fatigue or discomfort caused by operating the hand control levers. This can be especially problematic in lever-operated mowing machines because of the user's need to continuously hold the hand control levers over a prolonged period of time in order to keep the mowing machine traveling at a desired speed with a desired direction. Therefore, there is a need to overcome these disadvantages.

SUMMARY OF THE INVENTION

The present invention generally relates to mowing machines. More specifically, the present invention relates to mowing machines which include ergonomic hand control levers which reduce or eliminate certain anatomical stress associated with the operation of such mowing machines.

In one embodiment, the mowing machine includes a plurality of ergonomically angled hand control levers operable by the user. To operate the mowing machine, the user grips at least one of the hand control levers, holding the hand control lever at a desired position. The hand control levers are biased to have a neutral position. By pushing the hand control levers beyond the neutral position, the user can propel the mowing machine forward, and by pulling the hand control levers behind the neutral position, the user can propel the mowing machine backward. The user can make a turn by holding the hand control levers are different positions relative to one another.

Each hand control lever includes a grip member. The grip member is angled for the user's comfort. This angular position eliminates a certain degree of stress in the user's wrists which would otherwise be present. The particular angular position of each such grip member can be described alternatively as: (a) not perpendicular to the mowing machine's travel line; (b) oblique to the mowing machine's travel line, such that the grip member axis forms an oblique angle with the travel line; or (c) perpendicular or substantially perpendicular to the user's forearm axis.

It should be understood that the mowing machine has a travel line or line of direction whether the mowing machine is at rest or in motion along a straight or curved path. The term travel line or line of direction is used herein to refer to the mowing machine's center line. The center line of the mowing machine is a straight line which is perpendicular to the axis of the drive wheel axle of the mowing machine. Preferably, the mowing machine center line passes through a middle point on the drive wheel axle and a middle point on the front axle of the mowing machine.

In another embodiment, the mowing machine includes: (a) a power unit coupled to a drive mechanism; (b) drive wheels which are driven by the drive mechanism; and (c) a control lever linkage which couples the hand control levers to the drive mechanism. The hand control levers are pivotally connected to the control lever linkage so that the grip members can have a plurality of different angles relative to the travel line of the mowing machine. Preferably, it is relatively infrequent that the user holds the grip members at a position where the grip members are perpendicular to the travel line.

The mowing machine of the present invention, in one embodiment, includes hand control levers which reduce or eliminate the angle and anatomical stress in the user's wrists when the user is pushing, pulling and holding the hand control levers. This type of mowing machine provides mowing machine users with greater comfort and enhances their overall experience in operating mowing machines.

It is therefore an advantage of the present invention to provide mowing machines with ergonomic hand control levers.

Another advantage of the present invention is to reduce or eliminate certain anatomical stress in users of mowing machines and lever-operated machines.

Yet another advantage of the present invention is to facilitate the operation of mowing machines.

Additional features and advantages of the present invention are described in, and will be apparent from, the following Detailed Description of the Invention and the figures.

DETAILED DESCRIPTION OF THE INVENTION

Figure 3:
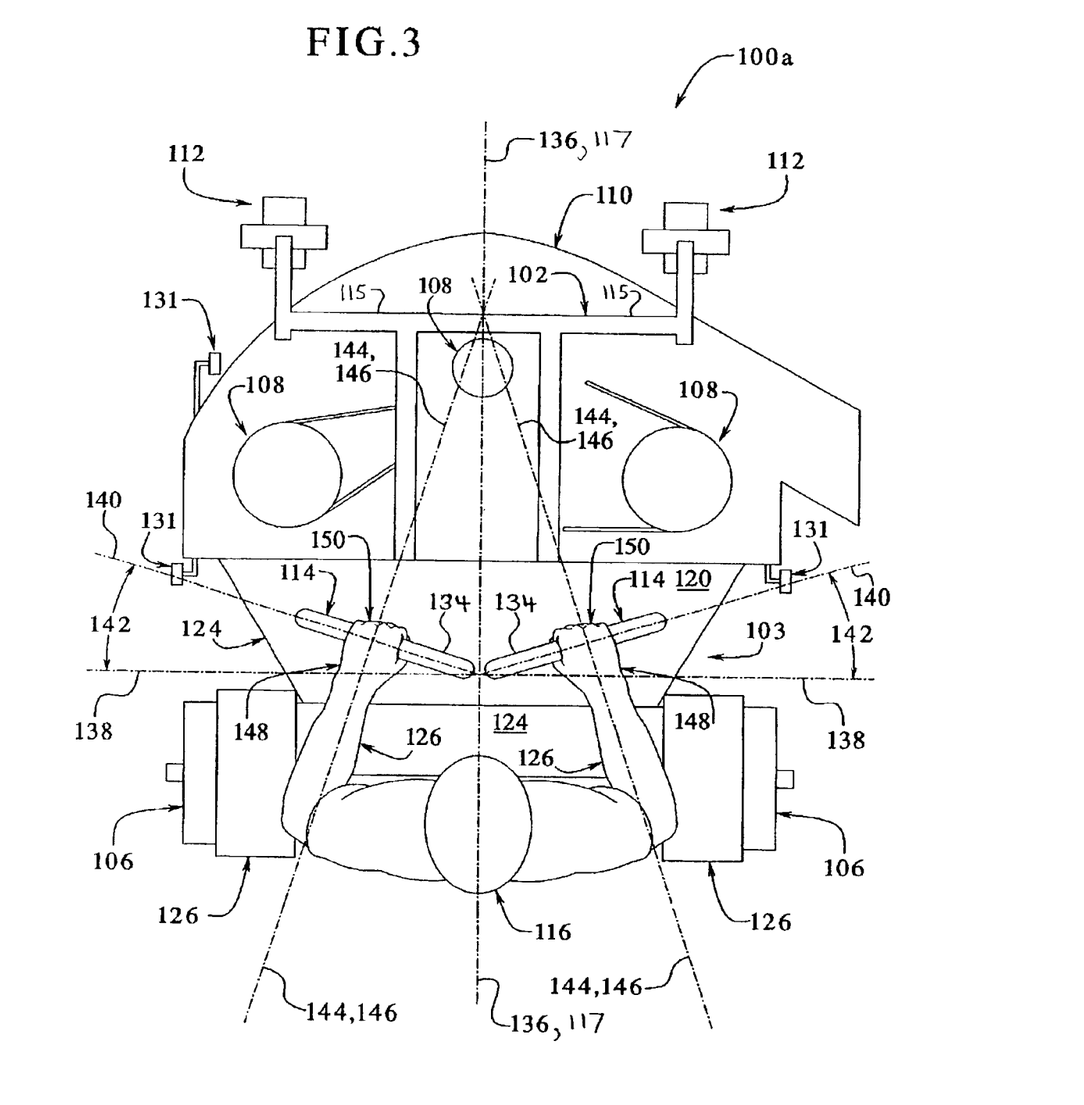
FIG. 3 is a top or plan view of the mowing machine illustrating a user holding the hand control levers at a desired position in one embodiment of the mowing machine of the present invention.
Figure 8:
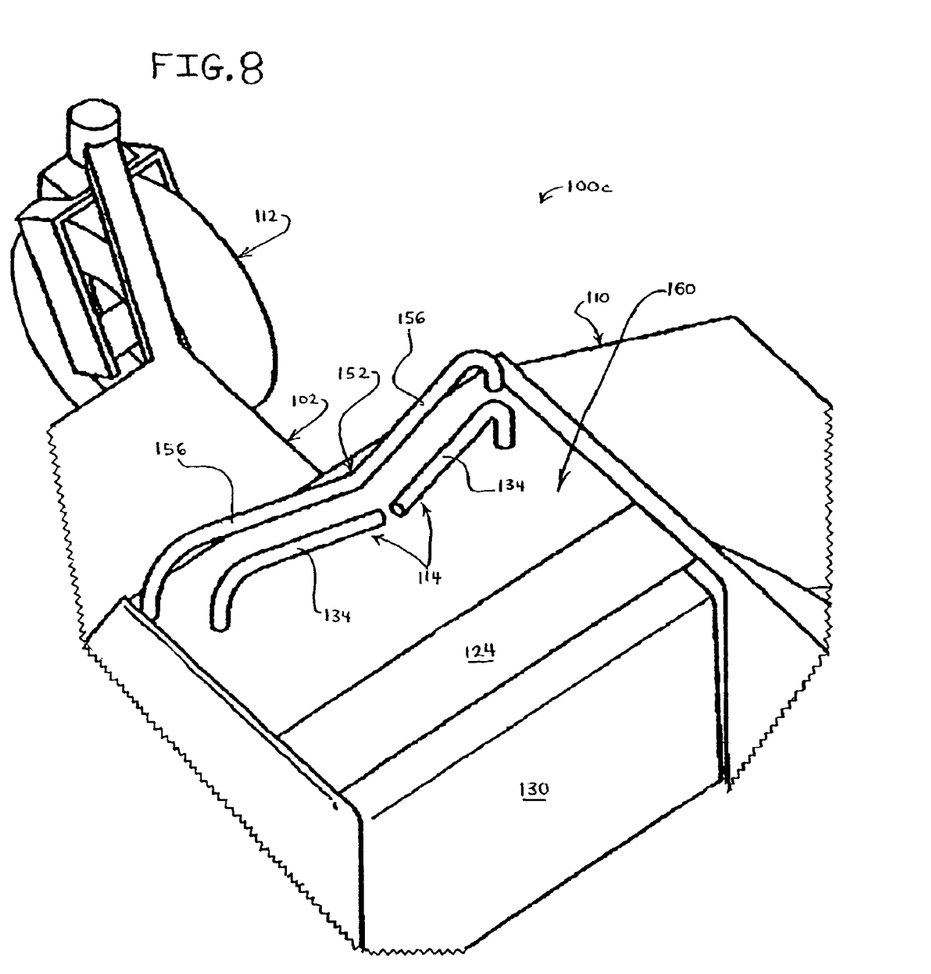
FIG. 8 is a fragmentary rear elevated perspective view of the mowing machine illustrating the hand control levers and the hand support member in one embodiment of the present invention.

Referring now to the drawings, FIG. 3 illustrates mowing machine 100a, FIGS. 4 to 7 illustrate mowing machine 100b and FIG. 8 illustrates mowing machine 100c. Mowing machines 100a, 100b and 100c, which are different embodiments of the mowing machine of the present invention, are generally referred to herein as mowing machine 100.

Mowing machine 100 includes: (a) a frame 102 which supports a body 103 and a power unit (not shown) which propels the mowing machine 100 forward and backward; (b) a wheel drive mechanism (not shown) coupled to the power unit which transfers power from the power unit to the drive wheels 106; (c) a mower drive mechanism 108 which transfers power from the power unit to the mower deck 110; (d) a plurality of front wheels 112, preferably free-rotating swivel or castor wheels mounted to the frame 102 which enable the mowing machine 100 to make turns; (e) at least one, and preferably two, hand control levers 114 which enable the user 116 to control the direction and speed of the mowing machine 100; and (f) control lever linkage 118 which couples the hand control levers 114 to the wheel drive mechanism. The hand control levers and the control lever linkage are referred to herein as the hand control assembly.

The frame 102 includes a front axle 115 connected to the front wheels 112, and the frame 102 includes a drive wheel axle (not shown) connected to the drive wheels 106. The mowing machine 100 has a straight mowing machine center line 117 which is perpendicular to the axis of the drive wheel axle. The mowing machine center line 117 preferably passes through a middle point on the drive wheel axle and a middle point on the front axle 115.

The body 103 of the mowing machine 100 includes a power unit cover 120, a fuel tank 122 (shown in FIGS. 6 to 8 only) which delivers fuel to the power unit, a control panel 124 which enables the user 116 to set various functions of the mowing machine 100, fenders 126 which cover the upper portion of the drive wheels 106, a standing frame 128 (shown in FIGS. 6 and 8 only) which supports the user's weight when the user stands and rides on the mowing machine 100 and a generally vertically extending user support 130 which provides support for the user 116 when the user 116 leans against the mowing machine 100 while operating the mowing machine 100. In another embodiment, the mowing machine can include a seat (not shown) for the user instead of a standing frame 128. In an additional embodiment, the frame or body of the mowing machine defines a walking space for the user to walk adjacent to the mowing machine while the mowing machine propels itself forward or backward.

The power unit of the present invention can include any suitable mechanism which generates power such as a fuel engine or an electric motor. Preferably, the power unit is an internal combustion engine. The wheel drive mechanism and mower drive mechanism 108, both of which are coupled to the power unit, can include any suitable mechanism or set of mechanisms which transmit power from the power unit to the drive wheels 106 and to the mower deck 110, including, but not limited to, one or more drive belts, a hydraulic system or a suitable combination thereof. Preferably, the mower drive mechanism 108 is a drive belt system. It should be appreciated that the wheel drive mechanism and the mower drive mechanism can be included within a single suitable drive mechanism or drive assembly.

The mower deck 110 includes one or more cutting blades (not shown) mounted to the underside of the mower deck 110. The mower drive mechanism 108, coupled to the power unit, rotates the blades for cutting grass, plants, leaves and other materials. The mower deck 110 also includes a plurality of free-rotating deck wheels 131 rotatably connected to the mower deck 110 which keep the mower deck 110 and the blades a minimum distance from the ground.

Each of the hand control levers 114 is preferably independently operable and is independently coupled to the wheel drive mechanism by control lever linkage 118. Preferably, each hand control lever 114 has a neutral position. The user can propel the mowing machine 100 forward by pivoting the hand control levers 114 beyond the neutral position to a forward limit position. The user can propel the moving machine 100 backward by pivoting the hand control levers 114 behind the neutral position to a backward limit position. By moving the hand control levers 114 to different positions relative to one another, the user 116 can control the direction of the mowing machine 100.

Figure 5:
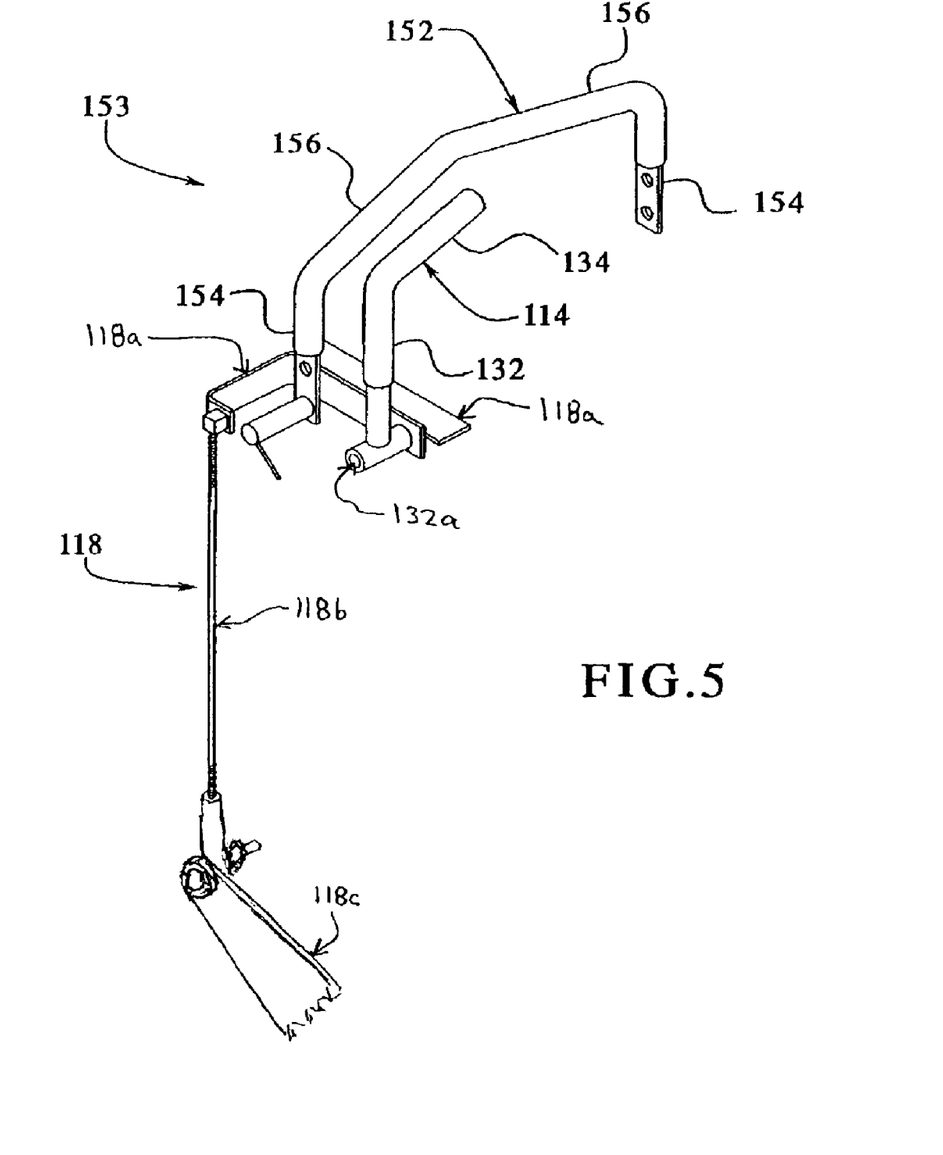
FIG. 5 is an elevated rear perspective view of the hand control assembly in one embodiment of the mowing machine of the present invention.
Figure 6:
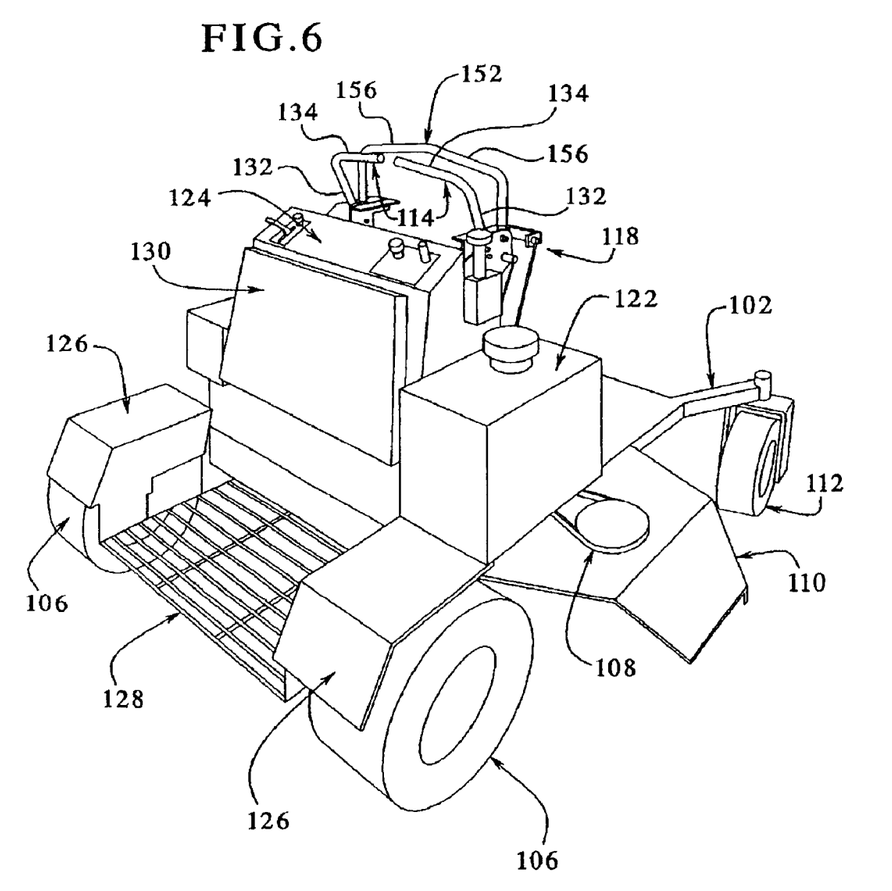
FIG. 6 is an elevated rear perspective view of the mowing machine in one embodiment of the present invention.
Figure 7:
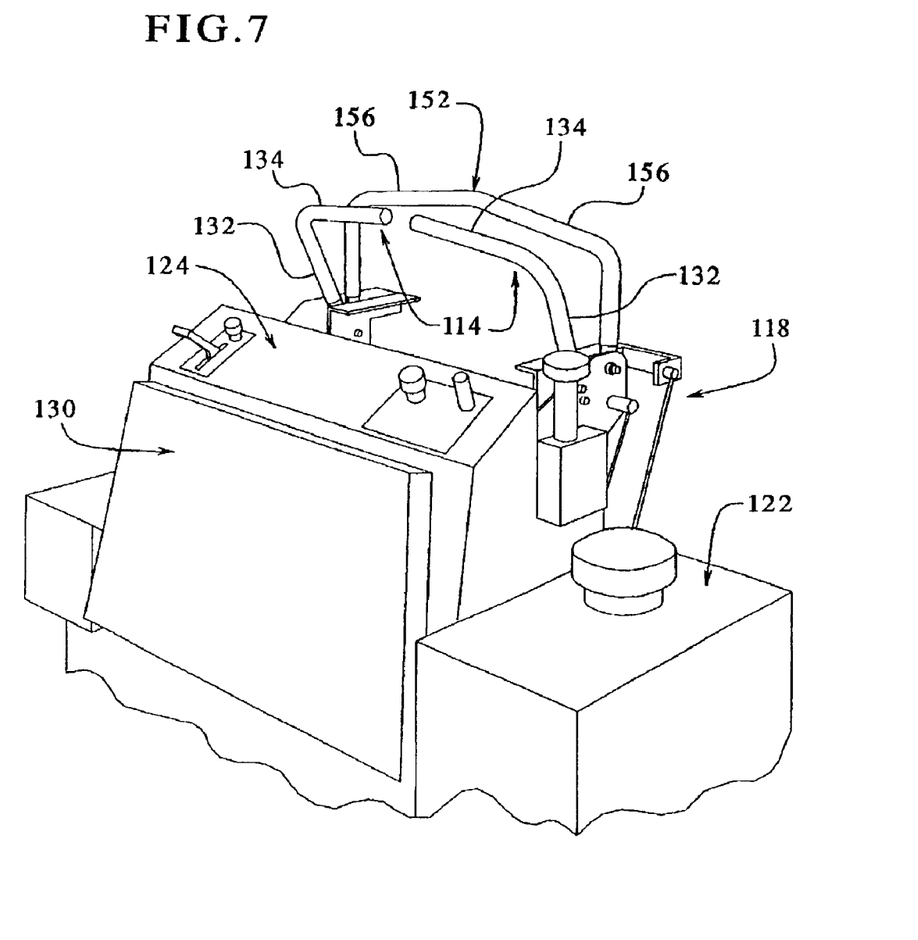
FIG. 7 is a fragmentary rear elevated perspective view of the mowing machine illustrating the hand control levers, support member and control panel in one embodiment of the present invention.

As best shown in FIG. 5, in one embodiment the hand control levers 114 include an engaging member 132 which engages with the control lever linkage 118 and a grip member 134 which the user 114 holds when operating the mowing machine 100. Preferably, the grip member 134 has a straight or linear shape. It should be appreciated that the hand control lever 114 can include members in addition to the engaging member 132 and the grip member 134. Such additional members can be straight, curved, bent or otherwise non-linear in shape.

Referring back to FIGS. 3 and 4, the mowing machine 100 has a forward and backward or fore and aft direction of travel indicated by travel line 136. For reference purposes, mowing machine 100 also has a reference line 138 which is perpendicular to the travel line 136. The grip member 134 has a grip member axis 140. Each grip member 134 is positioned on the mowing machine 100 in such a manner the grip member axes 140 are oblique to the travel line 136. Put another way, the grip member axes 140 have an angle relative to the reference line 138. It should be appreciated that even if the grip member 134 is nonlinear, the grip member axis 140 can be determined by intersecting the maximum number of portions of such a nonlinear grip member with a straight line.

Figure 4:
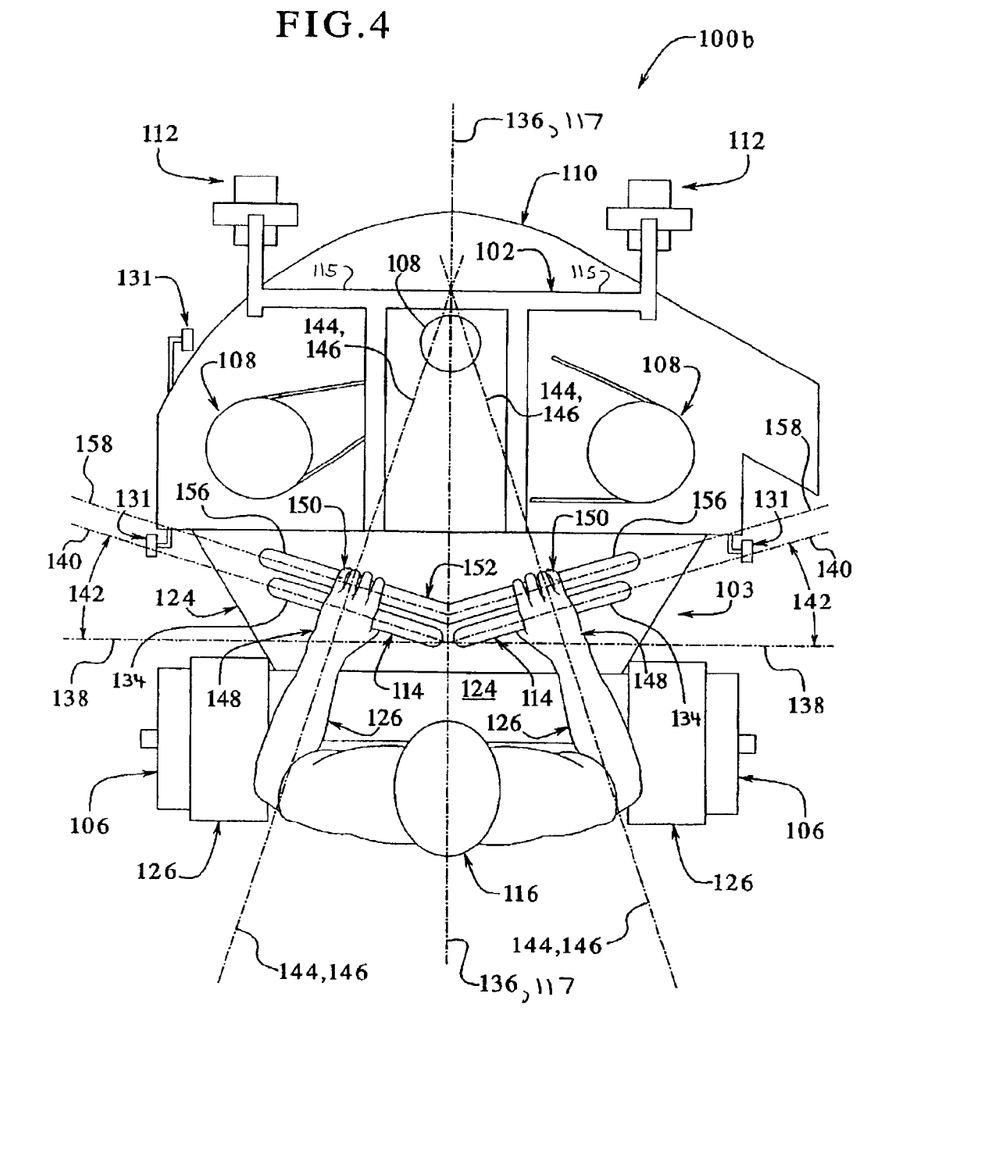
FIG. 4 is a top or plan view of the mowing machine illustrating a user holding the hand control levers at a desired position using the support member in one embodiment of the mowing machine of the present invention.

The intersection of grip member axis 140 and reference line 138 forms two identical acute angles and two identical obtuse angles. Acute angle 142, illustrated in FIGS. 3 and 4, is less than ninety degrees and preferably is within the range of one to thirty degrees. It is contemplated that the present invention is most effective when acute angle 142 is approximately five degrees.

The angular position of the grip members 134 can also be described with respect to an X-Y plane instead of the reference line 138. Each grip member 134 is within an X-Y plane, preferably a single X-Y plane which is substantially horizontal to the driving surface of the mowing machine. The end of the grip member axis 140 which is closest to the middle of the mowing machine 100 is positioned on an X-axis of the X-Y plane, and the other end of the grip member axis 140 is positioned at an acute angle relative to the X-axis. This acute angle is positive. For purposes herein, a positive angle is an angle positioned in an X-Y quadrant above the X-axis. In one example for the right hand grip member 134, the acute angle in the first quadrant may be a positive five degrees positioned counterclockwise of the positive X-axis. In one example for the left hand grip member 134, the acute angle in the second quadrant may be a positive five degrees positioned clockwise of the negative X-axis.

Figure 2:
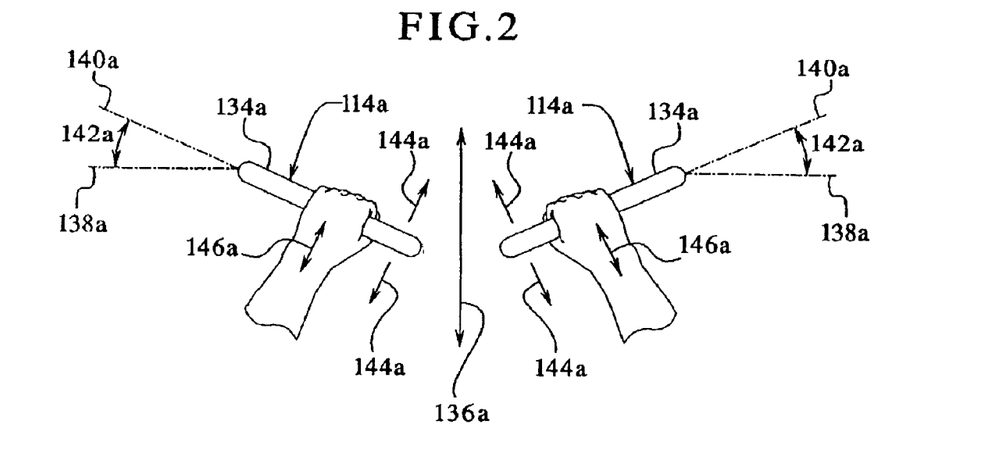
FIG. 2 is a top or plan view of the hand control levers, illustrating a user pushing and pulling the hand control levers in one embodiment of the mowing machine of the present invention.

In operation, the user 116 applies a force, pushing or pulling hand control levers 114 along a force line 144, see FIG. 2. Preferably, the force line 144 is substantially in line with the user's forearm axis 146. It should be appreciated that, as illustrated in FIGS. 3 and 4, the user's need to obviate his/her elbows with respect to his/her body causes the forearm axis 146 to be positioned at an angle relative to the travel line 136. As discussed earlier, the user may need to obviate his/her elbows in order to reach the grip members 134 and/or use his/her arm and shoulder muscles to push and pull the hand control levers 114. This phenomenon causes the forearm axis 146 or line of movement to intersect with the travel line 136. Accordingly, this phenomenon causes the user's wrists 148 and hands 150 to radially deviate. In other words, the wrists 148 and hands 150 deviate in the direction of the forearm's radius which is also in the direction of the body's midline.

Because the grip members 134 are mounted on the mowing machine 100 at acute angle 142 relative to reference line 138, the grip members 134 ergonomically accommodate for the user's radial deviation of the wrists 148 and hands 150. Preferably, the grip member axis 140 is perpendicular to, or substantially perpendicular to, the forearm axis 146. As such, the user's force is transmitted through the forearm along the forearm axis 146 which is substantially perpendicular to grip member axis 140.

Referring back to FIG. 2, the force line 144a is parallel or substantially parallel with the forearm axis 146a. The intersection of reference line 138a and grip member axis 140a forms an acute angle 142a. Because the hand control lever 114a is mounted to the mowing machine at this angle 142a, there is a relatively small, if any, wrist angle in the user's arm. It should be appreciated that the grip member axis 140a need not be exactly perpendicular to the forearm axis 146a in order for the present invention to be effective.

In the embodiment illustrated in FIGS. 4 to 7, the mowing machine 100b includes a user support member 152 mounted to the mowing machine 100b adjacent to the hand control levers 114. The user support member 152, hand control levers 114 and control lever linkage 118 are collectively referred to herein as the hand control assembly 153.

The control lever linkage 118 includes: (a) a lever arm 118a which is rigidly connected to the engaging member 132; (b) a connecting rod 118b connected to the lever arm 118a; and (c) a bracket 118c pivotally connected to the connecting rod 118b. The bracket 118c couples the connecting rod 118b to the wheel drive mechanism. The lever arm 118a and the engaging member 132 both define a hole or opening 132a. A bolt or pin (not shown) is received by the opening 132a. This pin rotatably connects the lever arm 118a and the engaging member 132 to the mowing machine frame. Preferably, one or more biasing members (such as springs) are coupled to the bracket 118c in order to bias the hand control levers 114 to their neutral positions.

Although the hand control levers are preferably coupled to the drive mechanism by control lever linkage 118, the hand control levers of the present invention can be directly or indirectly coupled to the drive mechanism in alternate arrangements. For example, the hand control levers can be coupled to the drive mechanism by any suitable electronic or hydraulic controls or actuators which co-act with the hand control levers and the drive mechanism.

In order to propel the mowing machine, the user can pivot one or both of the hand control levers 114 relative to the mowing machine frame. In this embodiment, the hand control levers 114 pivot or rotate about an axis which is perpendicular or substantially perpendicular to the travel line of the mowing machine. For purposes of this embodiment, a user described as pushing and pulling the hand control levers 114 means the same as the user pivoting the hand control levers 114 in opposite directions.

The user support member 152 functions as a handrest or support for the user when operating the mowing machine. The user support member 152 is preferably rigidly connected to the frame 102, though the user support member 152 can have adjustable positions for the user. In this embodiment, the user support member 152 is a one-piece member which includes two engaging members 154 and two grip members 156. Each grip member 156 is preferably straight and has a grip member axis 158 which is preferably parallel or substantially parallel with each adjacent grip member axis 140.

A user 116 can rest and support his/her fingers, hands, wrists and arms on grip members 156. In addition, the user 116 can use the grip members 156 as reference points for gauging the degree to which the user has displaced the hand control levers 114 forward or backward relative to the neutral position. Furthermore, the grip members 156 provide the user 116 with an aid in controlling the degree of hand or arm force the user applies to the hand control levers 114. Since the grip members 156 are parallel or substantially parallel to the grip members 134 of the hand control levers 114, the grip members 156 are positioned at an angle which ergonomically accommodates for the user's radial deviation described above.

It should be understood that the degree of radial deviation experienced by users can vary within a range due to the anatomical differences in users. In one embodiment, the hand control levers are adjustable within this range. Preferably, the hand control levers include a suitable adjustment mechanism (not shown) which enables the user to adjust the initial or neutral angular position of the grip members. In one embodiment in which the mowing machine includes a plurality of separate support members, each support member is mounted to the mowing machine 100b adjacent to a hand control lever, and each such support member includes a suitable adjustment mechanism for adjustment by the user.

In mowing machine 100c, the hand control levers 114 and user support member 152 are received by a substantially horizontal wall, such as a panel or cover 160. Preferably, the cover 160 covers the upper portion of the control lever linkage 118. Accordingly, the cover 160 reduces the possibility that materials, clothing or other items become lodged or caught in the control lever linkage 118. In addition, a user can, at times, rest and support his/her wrists on the cover 160.

In operation of one embodiment of the present invention, the user starts the power unit of the mowing machine and uses the control panel 124 to set the desired settings for the user's task. Initially, the hand control levers 114 are preferably biased or predisposed at a neutral position. In this neutral position, the drive wheels 106 are not in motion. The user can move the mowing machine forward at a desired speed by pushing the hand control levers 114 beyond the neutral position and holding the hand control levers 114 at a desired position. Likewise, the user can move the mowing machine backward at a desired speed by pulling the hand control levers 114 behind the neutral position and holding the hand control levers 114 at a desired position. The user can turn the mowing machine clockwise or counterclockwise by leaving one hand control lever 114 at its neutral position and pushing the other hand control lever 114 either beyond or behind the neutral position. In order to make a relatively quick turn with a relatively small or zero radius, the user can pull one of the hand control levers 114 behind its neutral position while simultaneously pushing the other hand control lever 114 beyond its neutral position. For all these operational activities, the user must hold onto at least one of the hand control levers 114. In certain embodiments described above, the user can rest his/her hands on the user support member 152 for support.

Because the grip members 134 are mounted to the mowing machine at a particular angle relative to the frame 102 of the mowing machine, the user's forearm axis 146 is perpendicular or substantially perpendicular to the grip member axis 140. Therefore, the user has little or no angle in his/her wrist despite the user's natural radial deviation in his/her wrist and hand. Accordingly, any anatomical stress which would otherwise result from any radial deviation in the user's hands and wrists, is reduced or eliminated.

Figure 9:
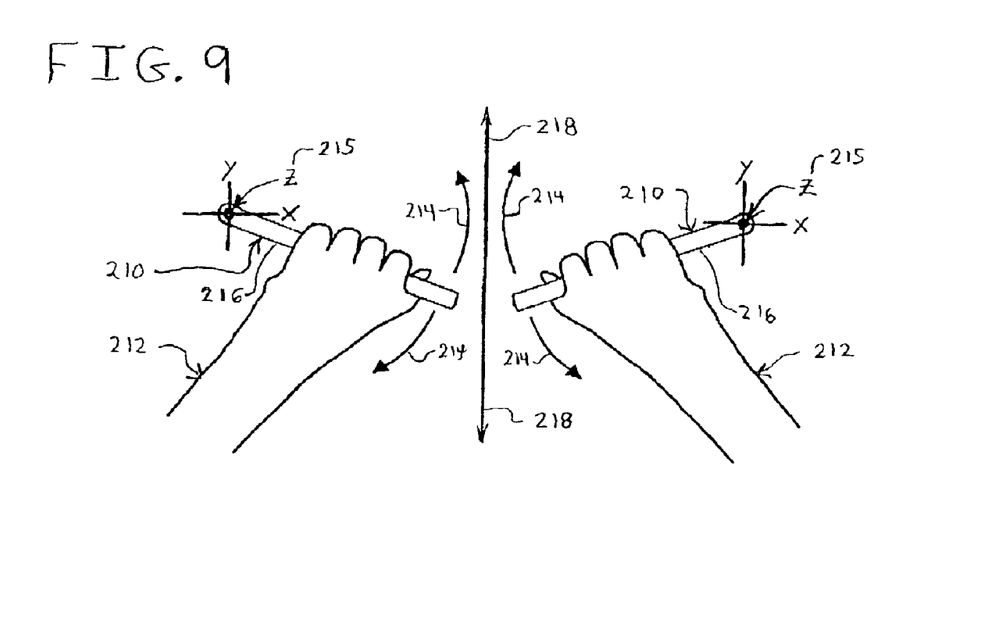
FIG. 9 is a top plan view of the hand control levers, illustrating a user pivoting the hand control levers about a Z-axis in one embodiment of the mowing machine of the present invention.

In another embodiment illustrated in FIG. 9, the hand control levers 210 are pivotally connected to the control lever linkage to enable a user 212 to push and pull the hand control levers 210 along an arc 214. In this embodiment, when the user periodically pushes and pulls the hand control levers 210, the user can periodically move his/her elbows toward and away from his/her body, causing the wrists to periodically radially deviate and ulnarally deviate.

The hand control levers 210 pivot to accommodate the user's periodic radial deviation and ulnar deviation. The hand control levers 210 rotate or pivot about a Z-axis 215 which is substantially perpendicular to the driving surface of the mowing machine. The hand control levers 210 can be pivotally connected to the control lever linkage in any suitable manner. Preferably, the control lever linkage includes a suitable gear, gear set or other mechanism (not shown) which translates the rotary force of the hand control levers 210 to the drive mechanism for controlling the drive wheels.

Consequently, a user 212 can operate the mowing machine by pivoting each grip member 216 between a plurality of positions along the arc 214. Preferably, the hand control levers 210 are biased to a neutral position. By pivoting the grip members 216 to positions beyond or behind neutral, the user 212 can propel the mowing machine along a desired travel line 218. This pivotal function of the hand control levers 210 enables the user 212 to operate the mowing machine by holding the grip members 216 at different angles relative to the travel line 218. Preferably, it is relatively infrequent that the user 212 holds the grip members 216 at a position where the grip members 216 are perpendicular to the travel line 218.

Figure 10:
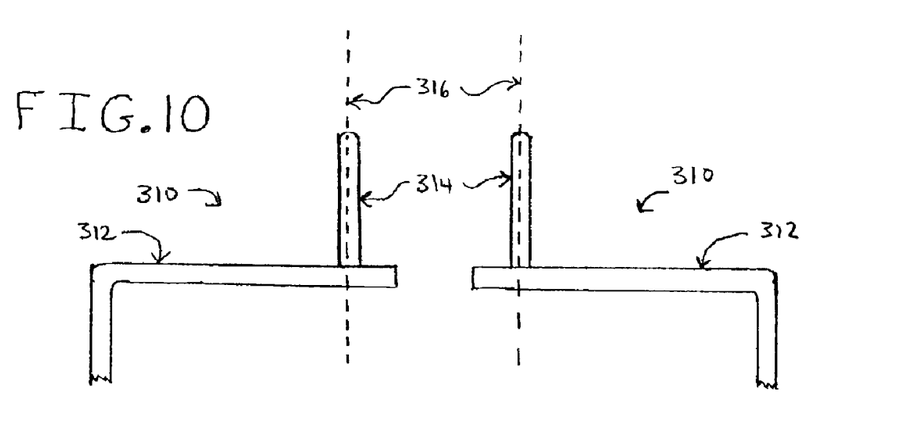
FIG. 10 is a side elevation view of the hand control levers with upstanding grip members in one embodiment of the mowing machine of the present invention.

In another embodiment illustrated in FIG. 10, each hand control lever 310 includes: (a) an engaging member 312 which engages the control lever linkage; and (b) an upstanding grip member 314. Grip member 314 has an axis 316 which is preferably perpendicular or substantially perpendicular to the driving surface of the mowing machine. The grip member 314 can be rigidly or rotatably connected to the engaging member 312.

It should be appreciated that the hand control levers and/or support members of the present invention can be included within any mowing machine, including, without limitation, tractors and riding mowers as well as walk-behind mowers, such as self-propelled and push mowers. In one walk-behind mower embodiment, the mower includes: (a) a mower deck which supports an engine unit; (b) one or more cutting blades in the mower deck which are rotated by the power unit; and (c) a handle assembly. The handle assembly includes one or more grip members which the user can use to move the mower in a forward or backward line of direction. In one embodiment, the grip member includes two portions which are preferably part of one integral member. The two portions have intersecting axes. Here, the grip member can be constructed with a relatively slight V-shape or U-shape wherein the V-shaped or U-shaped grip member is preferably positioned in a plane substantially horizontal to the driving surface and where the point or peak of the grip member is closest to the user. In another embodiment, the handle assembly includes two separate grip members whose axes intersect. In either embodiment, the axis of the grip member is angled so that the grip member is not perpendicular to the line of direction of the mower. Accordingly, the angled grip member ergonomically accommodates for the user's radial deviation while the user is holding, pushing, pulling, turning and generally controlling the walk-behind mower.

It should also be appreciated that the ergonomic grip members of the present invention can be included in one or more hand control members of any vehicle, whether or not the hand control members are movable. Such vehicles can include, without limitation, mowing machines, tractors, snow plow machines, snow throwers, vacuum machines, cleaning machines, power tools and recreational vehicles.

The present invention, in one embodiment, includes a mowing machine with ergonomic hand control levers. The hand control levers eliminate or reduce the anatomical stress in the user's hands and wrists. This type of mowing machine can decrease stress and fatigue experienced by mowing machine users and generally enhances the users' experience in operating mowing machines.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A mowing machine having front end and a rear end, the mowing machine operable along a line of direction, said mowing machine comprising:

a frame;

a power unit supported by the frame;

at least one drive mechanism coupled to the power unit;
a plurality of wheels rotatably connected to the frame, the wheels having at least one drive wheel coupled to the drive mechanism;
a right hand control lever engagable by a user's palm in such a fashion that the palm is substantially facing downward, the right hand control lever operatively coupled to the drive mechanism, the right hand control lever movable from a disengaged positions to at least one engaged position, said disengaged position being a distance from the front end of the mowing machine, said engaged position being a lesser distance from the front end of the mowing machine, the right hand control lever having at least one right grip member with an outer end and an inner end positioned along a right grip member axis, the right grip member axis being oblique to the line of direction when the right hand control lever has each one of the engaged and disengaged positions, the outer end of the right grip, member positioned a distance from the front end of the mowing machine, the inner end of the right grip member positioned a greater distance from the front end of the mowing machine;
a left hand control lever engagable by the user's palm in such a fashion that the palm is substantially facing downward, the left hand control lever operatively coupled to the drive mechanism, the left hand control lever movable from a disengaged position to at least one engaged position, said disengaged position being a distance from the front end of the mowing machine, said engaged position being a lesser distance from the front end of the mowing machine, the left hand control lever having at least one left grip member with an outer end and an inner end positioned along a left grip member axis, the inner end of the left grip member positioned adjacent to the inner end of the right grip, member, the left grip member axis being oblique to the line of direction when the left hand control lever has each one of the engaged and disengaged positions, the outer end of the left grip member positioned a distance from the front end of the mowing machine, the inner end of the left grip member positioned a greater distance from the front end of the mowing machine.

2. The mowing machine of claim 1, wherein the mowing machine includes a machine selected from the group consisting of a machine including a walk-behind mower, a machine including a self-propelled mower, a machine including a riding mower and a machine including a tractor.

3. A vehicle having a front end and a rear end, the vehicle operable along a line of direction on a driving surface, the vehicle comprising:
a frame;
a power unit supported by the frame;
at least one drive mechanism coupled to the power unit;
a plurality of wheels rotatably connected to the frame, the wheels having at least one drive wheel coupled to the drive mechanism;
a right hand control member engagable by a user's palm in such a fashion that the palm is substantially facing downward, the right hand control member operatively coupled to the drive mechanism, the right hand control member movable from a disengaged position to at least one engaged position, said disengaged position being a distance from the front end of the vehicle, said engaged position being a lesser distance from the front end of the vehicle, the right hand control member having at least one right grip member with an outer end and an inner end positioned along a right grip member axis, the right grip member axis being oblique to the line of direction when the right hand control member is in each of the engaged and disengaged positions, the outer end of the right grip member positioned a distance from the front end of the vehicle, the inner end of the right grip member positioned a greater distance from the front end of the vehicle; and;
a left hand control member engagable by the user's palm in such a fashion that the palm is substantially facing downward, the left hand control member operatively coupled to the drive mechanism, the left hand control member movable from a disengaged position to at least one engaged position, said disengaged position being a distance from the front end of the vehicle, said engaged position being a lesser distance from the front end of the vehicle, the left hand control member having at least one left grip member with an outer end and an inner end positioned along a left grip member axis, the inner end of the left grip member positioned adjacent to the inner end of the right grip member, the left grip member axis being oblique to the line of direction when the left hand control member is in each of the engaged and disengaged positions, the outer end of the left grip member positioned a distance from the front end of the vehicle, the inner end of the left grip member positioned a greater distance from the front end of the vehicle.

4. The vehicle of claim 3, wherein the vehicle includes a machine selected from the group consisting of a machine including a walk-behind mower, a machine including a self-propelled mower, a machine including a riding mower and a machine including a tractor.

5. A vehicle having a line of direction on a driving surface, the vehicle comprising:
a frame;
a power unit supported by the frame;
at least one drive mechanism coupled to the power unit;
a plurality of wheels rotatably connected to the frame, the wheels having at least one drive wheel coupled to the drive mechanism;
a hand support member supported by the frame, the hand support member having a right portion and a left portion, each of said portions having a front side and a back side;
a right hand control member engagable by a user's palm in such a fashion that the palm is substantially facing downward, the right hand control member positioned adjacent to the back side of the right portion of the hand support member, the right hand control member operatively coupled to the drive mechanism, the right hand control member movable from a disengaged position to at least one engaged position, said disengaged position being a distance from the hand support member, said engaged position being a lesser distance from the hand support member, the right hand control member having a right grip member with an outer end and an inner end positioned along a right grip member axis, the right grip member axis being oblique to the line of direction when the right hand control member is in each of the engaged and disengaged positions, the outer end of the right grip member positioned a distance from the hand support member, the inner end of the right grip member positioned a greater distance from the hand support member; and a left hand control member engagable by the user's palm in such a fashion that the palm is substantially facing downward, the left hand control member positioned adjacent to the back side of the left portion of the hand support member, the left hand control member operatively coupled to the drive mechanism, the left hand control member movable from a disengaged position to at least one engaged position, said disengaged position being a distance from the hand support member, said engaged position being a lesser distance from the hand support member, the right hand control member having a left grip member with an outer end and an inner end positioned along a left grip member axis, the inner end of the left grip member positioned adjacent to the inner end of the right grip member, the left grip member axis intersecting with the right grip member axis, the left grip member being oblique to the line of direction when the left hand control member is in each of the engaged and disengaged positions, the outer end of the left grip member positioned a distance from the hand support member, the inner end of the left grip member positioned a greater distance from the hand support member.

6. The vehicle of claim 5, which has at least one mechanism connected to the frame, the mechanism selected from the group consisting of a mowing mechanism, a plowing mechanism, a snow throwing mechanism, a vacuum mechanism and a cleaning mechanism.

7. The vehicle of claim 5, wherein the first grip member axis and the second grip member axis are each parallel or substantially parallel to the driving surface.

8. The vehicle of claim 5, wherein the right and left hand control members are each independently coupled to the drive mechanism.

9. The vehicle of claim 5, wherein the hand support member includes a one-piece member having a bend defining the left portion and the right portion.

* * * * *